United States Patent [19]
Piazza

[11] Patent Number: 5,881,291
[45] Date of Patent: Mar. 9, 1999

[54] SYSTEM FOR CONVERSION OF LOOP FUNCTIONS IN CONTINUATION-PASSING STYLE

[76] Inventor: Jeffrey E. Piazza, 20 Beechwood Rd., Waltham, Mass. 02154

[21] Appl. No.: 915,388

[22] Filed: Aug. 20, 1997

Related U.S. Application Data

[63] Continuation of Ser. No. 38,605, Mar. 29, 1993, abandoned.

[51] Int. Cl.[6] ........................................................ G06F 9/45
[52] U.S. Cl. ............................ 395/707; 395/706; 395/709
[58] Field of Search ..................................... 395/709, 706, 395/707

[56] References Cited

U.S. PATENT DOCUMENTS 5,099,450  3/1992  Berkling ................................... 395/800

OTHER PUBLICATIONS

Steele, Guy Lewis, Rabbit: A Compiler for Scheme, Dissertation, Massachusetts Institute of Technology, May 12, 1978, pp. 1–115.

D. Hammer, Compiler Compilers, 3rd International Workshop, cc. 90 Generating Efficient Code from Continuation Semantics, pp. 165–178.

Appel, Compile–Time Evaluation and Code Generation for Semantics–Directed Compilers, Dissertation, 26 Jul. 1985, pp. 3–17, 61–112.

Jones et al., A Self–Applicable Partial Evaluator for the Lambda Calculus, Computer Languages, 1990 Int. Conf. pp. 49–58.

Bloom, Can LGF be Topped? Flat Lattice Models of Typed Lambda Calculus, Logic Incs, 1988, 3rd Annual Symposium, pp. 282–295.

Pan et al., Denotational Semantics–Directed Compilation Using Prolog, Applied Computing Symposium 1990, pp. 122–127.

David Kranz, Richard Kelsey, Jonathan Rees, Paul Hudak, James Philbin and Norman Adams—Orbit: An Optimizing Compiler for Scheme, Jul. 1986, pp. 219–233.

Pascal Fradet and Daniel Le Metayer—Compilation of Functional Languages by Program Transformation, Jan. 1991, pp. 21–51.

The Scheme of Things, Bourbaki, Nick, *AI Expert*, Oct. 1990, vol. 5, No. 10, p. 19(5).

DML–A Meta–language and System for the Generation of Practical and Efficient Compilers from Denotational Specifications, Mikael Pettersson and Peter Fritzson, Proceedings of the 1992 International Conference on Computer Languages, conf. date 20–23 Apr.1992, IEEE Computer Society Press, pp. 127–136.

Compiling with Continuations, Andrew W. Appel, 1992, pp. 55–82.

O. Shivers, *Control–Flow Analysis of Higher–Order Languages or Taming Lambda* (May 1991).

*Primary Examiner*—Lucien U. Toplu

[57] ABSTRACT

A compiler and compilation method for processing a source program in a programming language in the Scheme/Lisp family into a representation known as continuation-passing style (CPS) before generating object code, with optimization also being involved in the processing. To simplify the code generator and optimization, and to allow the same code generator to be used for both non-loop as well as for loop functions, novel algorithms are described which find in the standard CPS intermediate tree sets of non-continuation lambda expressions with a common continuation, which can then be converted to optimized CPS code that can be processed by the same code generator as non-loop continuation functions.

10 Claims, 5 Drawing Sheets

SYSTEM FOR CONVERSION OF LOOP FUNCTIONS IN CONTINUATION-PASSING STYLE

This application is a continuation of Ser. No. 038,605, filed Mar. 29, 1995, now abandoned.

This invention relates to systems for processing programming language code in the Scheme/Lisp family of programming languages representing loops into continuation functions.

BACKGROUND OF INVENTION

Several compilation systems for programming languages in the Scheme/Lisp family of programming languages convert a source program into a representation known as continuation-passing style, or CPS, in order to analyze and optimize the program being compiled. CPS represents the program as a particular organization of lambda expressions. CPS representation makes flow-of-control information explicit through the use of continuations. Although continuations are formally functions, they differ from non-continuation lambda expressions (NCLEs) in that they do not themselves have continuation arguments. Except in special cases, NCLEs must be able to "return" to their callers by invoking a continuation argument; typically this is realized by generating a call instruction when invoking the NCLE. Continuation functions, on the other hand, can always be invoked with just a branch instruction.

For an explanation in detail of standard CPS conversion, as well as a description of example algorithms, reference is made to "Rabbit: A Compiler For Scheme" by Steele, published in MIT Artificial Intelligence Laboratory Technical Report 474, May 1978 (especially pp. 56–59); and "Orbit: An Optimizing Compiler For Scheme," by Kranz, YALEU/DCS/RR-632, Feb. 1988 (especially pp. 20–26) available from the Yale University Library, the contents of which publications are herein incorporated by reference. For further background, see also "Compiling With Continuations" by Appel, publ. 1992 by Cambridge University Press.

To summarize briefly, CPS conversion makes continuations explicit by transforming the program to continuation-passing style. Each source language lambda expression is given an additional formal parameter bound to a continuation to be invoked with the result of executing the body. Each call is provided with a corresponding extra argument, the continuation to the call. An intermediate node tree known as the CPS tree is produced.

More specifically, the transformation or conversion consists of adding an extra argument, a continuation, to each combination. Each lambda expression is similarly changed by introducing an extra formal parameter to correspond to the continuation it will be passed. After the transformation, the notions of procedure call and return have been unified; i.e., procedures no longer return. Instead, a procedure does a computation and calls its continuation with the result of the computation as argument.

A typical standard CPS compiler distinguishes between lambda expressions which are continuations and those which are not continuations and processes them differently.

Scheme and related programming languages use recursion in the source language to express iteration. A typical standard CPS compiler detects these "tail recursion loops", and uses a different code generation algorithm for loop functions than for non-loop functions.

SUMMARY OF INVENTION

An object of the invention is a system for converting non-continuation functions which represent loops and other constructs in programming languages in the Scheme/Lisp family into continuation functions.

A further object of the invention is a system for processing non-continuation functions which represent loops so as to simplify code generation and optimization.

In accordance with one aspect of the invention, as part of a compiling system of source code into object code during which the source program is converted into CPS, a novel loop-conversion algorithm is provided which converts non-continuation functions which represent loops and other constructs into continuation functions. This simplifies the code generator and optimizer by presenting fewer distinct cases to consider, since the same code generator can be used for both loop and non-loop functions.

In a preferred embodiment, the CPS loop conversion algorithm performs, broadly, two distinct tasks, each of which is believed novel. The first part identifies in the standard CPS code (typically in the form of a CPS tree) a "loop set," which is a set of NCLEs with the property that every reference to every name of the NCLEs is a call, and each such call is either a tail call from some member of the set, or a call with some distinguished continuation argument. The first part thus identifies both the set members and the distinguished continuation common to the set.

The second part takes the loop set and its common continuation identified in the first part and converts the set members into continuations in accordance with the invention.

Although the term "loop set" is chosen because loops are the most important case to which the algorithm of the invention applies, the definition given above actually doesn't require that a loop exist, and the algorithm does apply to non-loop situations, as will become clearer from the examples given hereinafter.

The above and further objects, details and advantages of the present invention will become apparent from the following detailed description of preferred embodiments thereof, when read in conjunction with the accompanying drawings.

DETAILED DESCRIPTION OF PREFERRED EMBODIMENT

Figure 1:
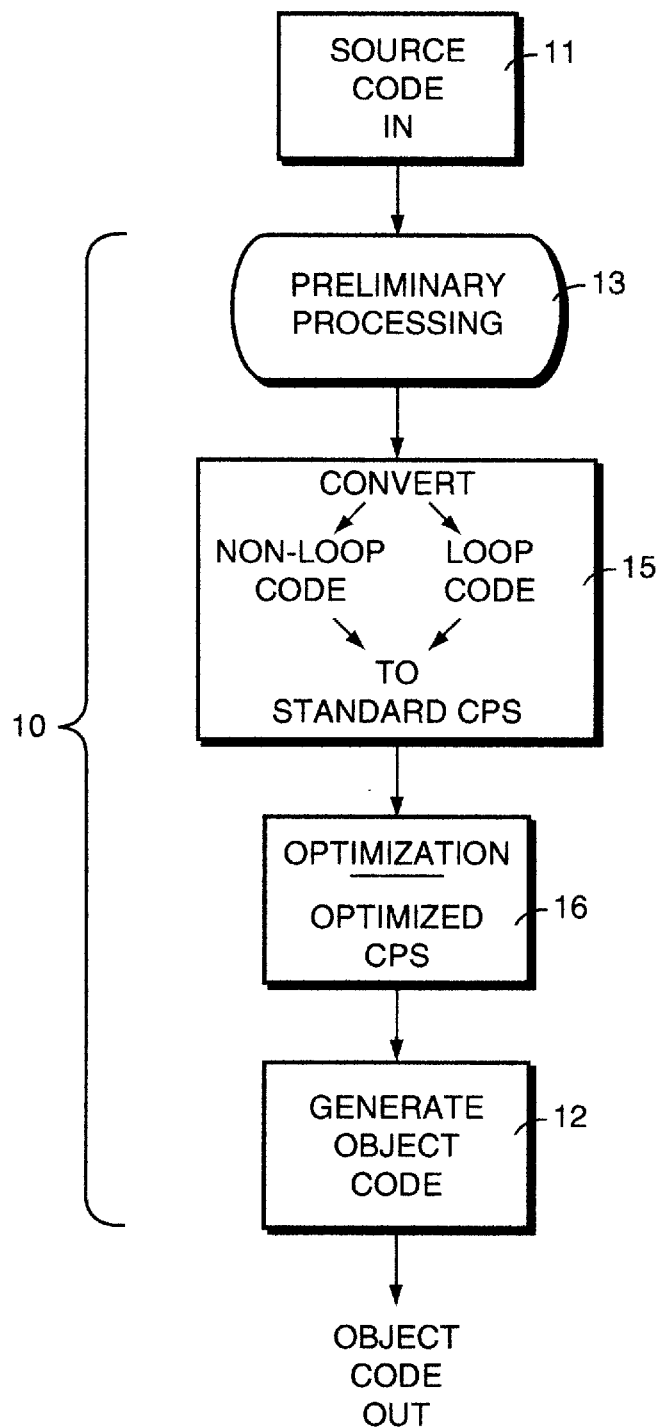
FIG. 1 is a block diagram showing a compiler flow chart employing one form of the CPS conversion algorithm in accordance with the invention.

FIG. 1 illustrates a typical compiler flow chart for generating object code from source code in the Scheme/List family of programming languages. The FIG. 1 depiction is an abbreviated version of the flow chart appearing on page 118 of the referenced Steele publication.

The function of a compiler, indicated generally at 10, is to process source code 11 into object code 12. In the process, in the Scheme/List family, the source code usually undergoes some preliminary processing 13. Afterwards, the processed code is converted into standard CPS 15, and undergoes optimization 16. Optimization can also be performed before the CPS conversion. Finally, after further processing, object code is generated 12.

Figure 3:
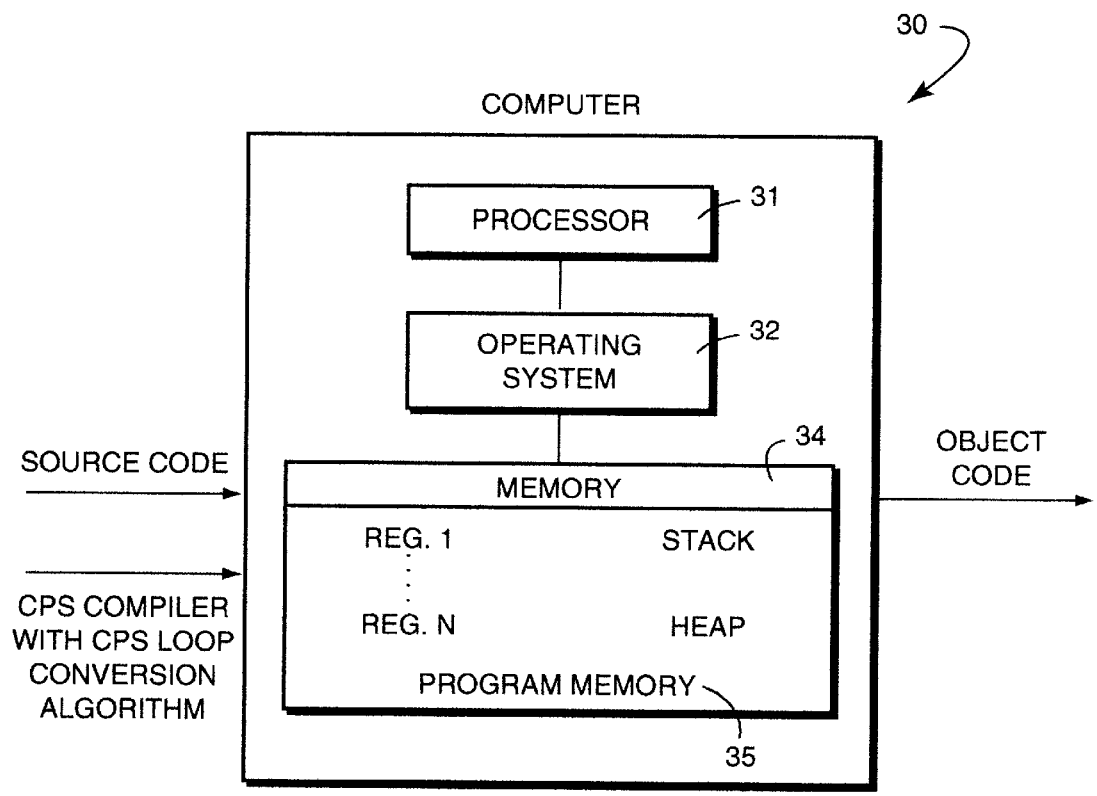
FIG. 3 is a block diagram of a typical computer for processing source code into object code.
Figure 4:
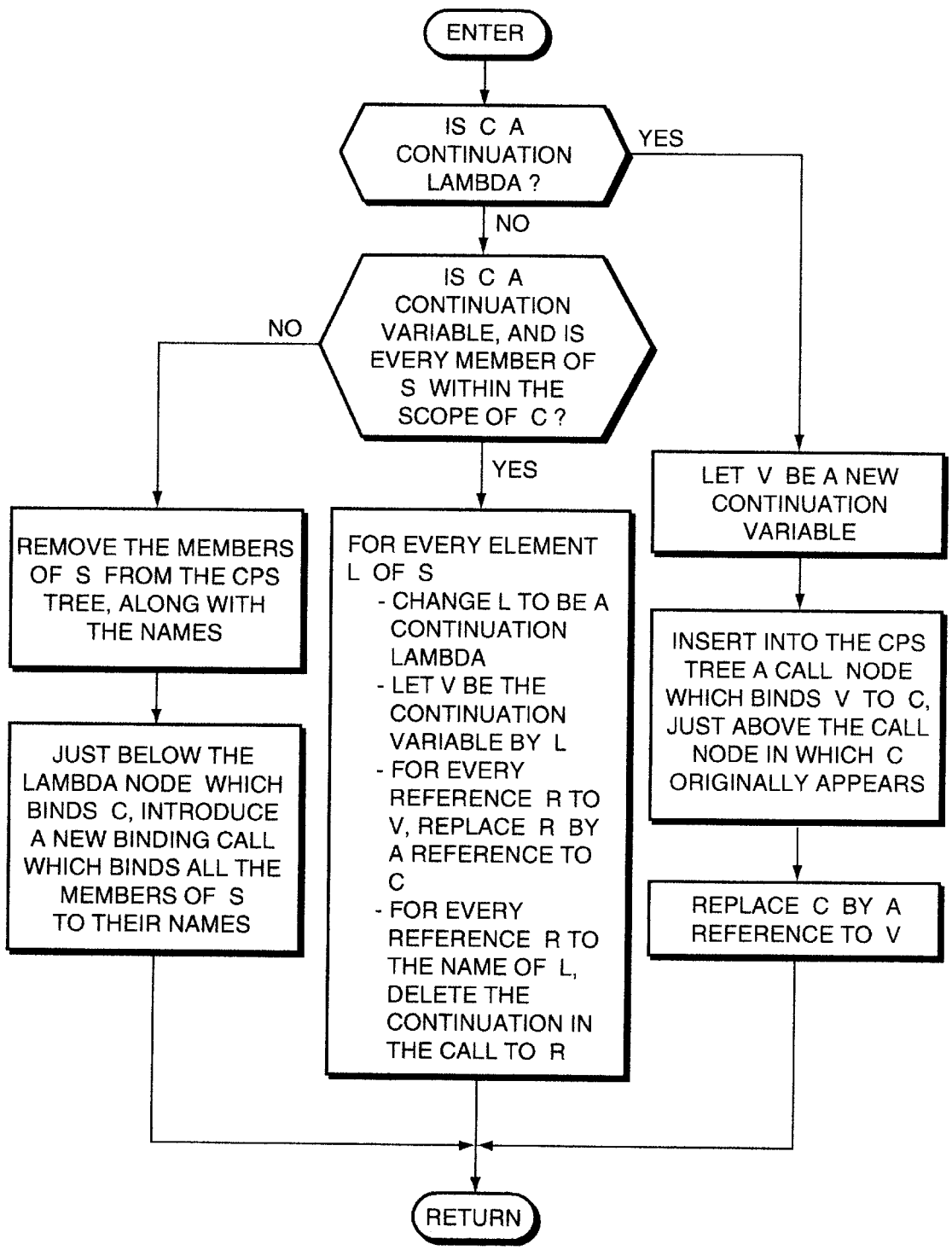
FIG. 4 is a flow diagram of an aspect of the present invention.

FIG. 3 is a block diagram of a typical computer for processing source code into object code with a suitable compiler program. As is well known, the computer 30 comprises the usual processor 31, an operating system 32, and memory 34, including memory 35 for storing programs to be run, such as a CPS compiler.

The present invention is concerned with block 16 (FIG. 1), and in particular to the conversion of standard CPS to an optimized form of CPS of code representing loops and other code in order to simplify object code generation.

The CPS loop conversion algorithm of the invention actually is comprised of two parts, which could be considered two distinct algorithms.

The first part identifies in the inputted standard CPS a "loop set," which is a set of NCLEs with the property that every reference to every name of the NCLEs is a call, and each such call is either a tail call from some member of the set, or a call with some distinguished continuation argument. The first part identifies both the set members and the distinguished continuation. The input to the first part is the CPS tree typically formed when the source code undergoes standard conversion to CPS.

The second part takes the identified loop set and its common continuation obtained in the first part and converts the set members into the optimized continuations.

The first part in pseudocode is as follows:

The procedure is-a-loop-p determines whether a set S of named NCLEs is part of a loop set with a particular continuation, C. If it is, is-a-loop-p returns the smallest extension of S which makes a loop; otherwise, is-a-loop-p returns false.

```
is-a-loop-p (S, C);
for every element L of S
    for every reference R to the name of L
        if R is used as a call argument rather than as a function then
            return false
        else if the continuation in the call to R is a lambda node then
            if the continuation is not C then
                return false
            else
                continue
        else // the continuation in the call to R is a reference to a variable
            let V be the variable whose reference is the continuation
            in the call to R.
            let VL be the lambda node that binds V.
            if V = C then
                continue
            else if VL has is a member of S then
                continue
            else if VL has a name then
                return is-a-loop-p (S plus VL, C)
            else
                return false
    next R
next L
return loop-set
```

The procedure find-loop-set-and-continuation takes a set S of named NCLEs and determines whether there's a continuation relative to which the named NCLEs can be extended into a loop. If so, the procedure returns the full loop set plus the continuation; otherwise, it returns false.

```
find-loop-set-and-continuation (S):
for every element L of S
    for every reference R to the name of L
        if R is used as a call argument rather than as a function then
            return false
        else if the continuation in the call to R is a lambda node then
            let C = the continuation in the Call to R
            let S' = is a-loop-p (S, C)
            if S' = false then
                return false
            else
                return S' and C
        else // the continuation in the call to R is a reference to a variable
            let V be the variable whose reference is the continuation
            in the call to R.
            let VL be the lambda node that binds V.
            if VL is a member of loop-set then
                continue
            else if is-a-loop-p (S, V) then
                return is-a-loop-p (S, V) and V
            else if VL has a name then
                return find-loop-set-and-continuation (loop-set plus VL)
            else
                return false
    next R
next L
return false
```

Given a loop set S and their common continuation C found in the first part, convert-loop converts all the members of S into continuation lambdas.

Exactly one of three conditions must be true of S and C in the found loop set:

(a) C is a continuation lambda;

(b) C is a continuation variable, and every member of S is within the scope of C; or (c) C is a continuation variable and at least one member of S is outside the scope of C.

The second part in pseudocode is as follows with condition or case (a) expressed in the first IF statement, condition or case (b) expressed in the first ELSE statement, and condition or case (c) expressed in the second ELSE statement: convert-loop (S, C):

```
if C is a continuation lambda then
    let V be a new continuation variable.
    Insert into the CPS tree a call node which binds V to C,
    just above the call node in which C originally
    appears. Replace C by a reference to V.
    return convert-loop (S, V)
else if C is continuation variable and every member of S is
within the scope of C then
    for every element of L of S
    Change L to be a continuation lambda
    Let V be the continuation variable bound by L
    for every reference R to V
    replace R by a reference to C
    for every reference R to the name of L
    delete the continuation in the call to R
else // C is a continuation variable and some member of S is
    // outside the scope of C. Because of the definition
    // of S and C, every reference to every member of S
    // is either within the scope of C or within the
    // scope of some member of S. Therefore it's
    // possible to move the members of S:
    Remove the members of S from the CPS tree, along with the
    names.
    Just below the lambda node which binds C, introduce a new
    binding call which binds all the members
    of S to their names.
    // Now all the members of S are within the scope of C.
    return convert-loop (S, C)
```

Note that when conditions (a) and (c) are satisfied, convert-loop repeats, until condition (b) is satisfied and the routine is exited.

Summarizing, when the non-continuation loop or other functions comprise a set of named NCLEs with the property that every reference to every name of the NCLEs is a call, and those references that are not tail-calls from some member of the set, are called with the identical continuation argument (either a continuation lambda or a continuation variable), determined by executing the procedures is-a-loop-p and find-loop-set-and-continuation of the first part, then one of the three specified conditions must be true: (a) c is a continuation lambda; (b) c is a continuation variable, and all the members of S fall within the scope of c; (c) c is a continuation variable, and at least one member of S falls outside the scope of c. Then, it is straightforward to provide the conversion to the optimized CPS using the convert-loop procedure of the second part. This will be illustrated with the following examples.

EXAMPLE 1

Normal conversion of a fragment in the Dylan programming language which is in the Lisp/Scheme family:

```
(bind-methods ((fact (i ff)
    (if (← i O)
    ff
    (fact (- i 1) (* i ff)))))
    (+ (fact n 1) 3))
``` to standard CPS yields the following CPS tree:

```
(letrec ((fact (k i ff)
    (if (← i O)
    (lambda () (k ff))
    (lambda () (fact k (- i 1) (* i ff))))))
    (fact (lambda (v) (+ C v 3)) n 1))
``` where C is the continuation which would receive the value of the original Dylan expression.

Prior art technology would attempt to recognize that fact is a loop, and special code generators would be used to arrange for calls to fact to be implemented with branch instructions, rather than with call instructions. Also, references to k would have to be treated specially, since no actual continuation would be passed.

The loop set found by the algorithm first part of the invention when the foregoing CPS tree is inputted consists of just the definition of the variable fact; the distinguished continuation is the lambda expression, (lambda (v) (+C v 3)), which makes this an example of case (a). The loop conversion algorithm of the invention changes the CPS tree to:

```
(letrec ((fact (k i ff)
    (if (← i 0)
    (lambda ( ) (k ff))
    (lambda ( ) (fact k (- i 1) (* i ff))))))
    ((lambda (g) (fact g n 1))
    (lambda (v) (+ C v 3))))
``` which is now handled as case (c), with the variable g being the distinguished continuation. Running the loop conversion algorithm of the invention again moves the binding of fact entirely within the scope of g:

```
((lambda (g)
    (letrec ((fact (k i ff)
        (if (← i O)
        (lambda () (k ff))
        (lambda () (fact k (- i 1) (* i ff))))))
        (fact g n 1)))
    (lambda (v) (+ C v 3)))
```

This version of the CPS tree is now an example of case (b), which can be converted by processing convert-loop again to its final form:

```
((lambda (g)
    (letrec ((fact (i ff)
        (if (← i O)
        (lambda () (g ff))
        (lambda () (fact (- i i) (* i ff))))))
        (fact n 1)))
    (lambda (v) (+ C v 3)))
```

Note that fact is now a continuation, which invokes g directly in order to exit. Code generation is simplified since fact can be treated like any other continuation, without requiring any further special processing.

EXAMPLE 2

The Dylan expression:

```
(+ (if (> x O)
    (bind ((f (method (yy) (+ yy x))))
    (if (> y O)
    (f y)
    (f (- y))))
    O)
    4)
``` yields the following standard CPS tree:

```
((lambda (g)
    (if (> x O)
    (lambda ()
    ((lambda (f)
    (if (> y O)
    (lambda () (f g y))
    (lambda () (- (lambda (my) (f g my)) y)))))
    (lambda (k yy) (+ k yy x))))
    (lambda () (g O))))
    (lambda (v) (+ C v 4)))
```

Note that although this expression does not contain any loops in the traditional sense, the set consisting of just the definition of f, (lambda (k yy) (+k yy x)), along with the distinguished continuation variable g, satisfies the definition of a "loop set." Note also that every reference to f occurs within the scope of g, making this an example of case (b). The loop conversion algorithm of the invention re-writes this CPS tree to:

```
((lambda (g)
    (if (> x O)
    (lambda ()
    (lambda (f)
    (if > y O)
    (lambda () (f y))
    (lambda () (- (lambda (my) (f my)) y))))
    (lambda (yy) (+ g yy x))))
```

-continued

```
    lambda () (g 0))))
 (lambda (v) (+ C v 4)))
```

Note that the value of f, (lambda (yy) (+g yy x)), is now a continuation function, and it includes a direct reference to the distinguished continuation, the variable g.

EXAMPLE 3

```
(bind ((f (method (a) (* a 2))))
    (+ (if (< x 0)
        (f (- X))
        (f x))
    1))
```

Normal conversion to standard CPS yields the following CPS tree:

```
((lambda (f)
    ((lambda (g)
        (if (< x 0)
            (lambda () (- (lambda (xx) (f g xx)) x))
            (lambda () (f g x))))
        (lambda (v) (+ C v 1))))
    (lambda (k a) (* k a 2)))
```

Here the loop set is the single value for f, (lambda (k a) (* k a 2)), and the distinguished continuation is the variable g. Note also that (lambda (k a) (* k a 2)) falls outside the scope of the variable g, making this an example of case (c). The loop conversion algorithm of the invention transforms this CPS tree into the following tree:

```
((lambda (g)
    ((lambda (f)
        (if (< x 0)
            (lambda () (- (lambda (xx) (f g xx)) x))
            (lambda () (f g x))))
        (lambda (k a) (* k a 2))))
    (lambda (v) (+ C v 1)))
``` which is an example of case (b). The conversion algorithm then runs again, to produce:

```
((lambda (g)
    ((lambda (f)
        (if (< x 0)
            (lambda () (- (lambda (xx) (f xx)) x))
            (lambda () (f x))))
        (lambda (a) (* g a 2))))
    (lambda (v) (+ C v 1)))
```

Note that f's definition, (lambda (a) (* c a 2)), is now a continuation lambda expression, which invokes the distinguished continuation, g, directly as its exit.

Where condition (b) obtains, as will be clear from the foregoing examples, then without difficulty we may replace all references to the continuation arguments of the members of S (other than references in calls to members of S) by references to C, and then we may delete the continuation arguments themselves and convert all the member of S into continuations. (The continuation argument in all calls to all members of S can be removed: they were either recursive calls, or calls with C as the continuation).

For case (c), the criteria for selection of S, however, determined by the two procedures is-a-loop-p and find-loop-set-and-continuation, guarantees that all non-recursive references to members of S fall within the scope of C. Therefore, it is possible to "move" on the intermediate node tree the definitions of all the members of S so that they fall within the scope of C, without worrying that doing so will leave a reference to a member of S outside the scope of the newly constructed definition.

For case (a) in which C happens to be a clambda node, rather than a continuation variable, we simply introduce a new continuation variable, binding it to the clambda in question, and then handle it as described above.

Figure 2:
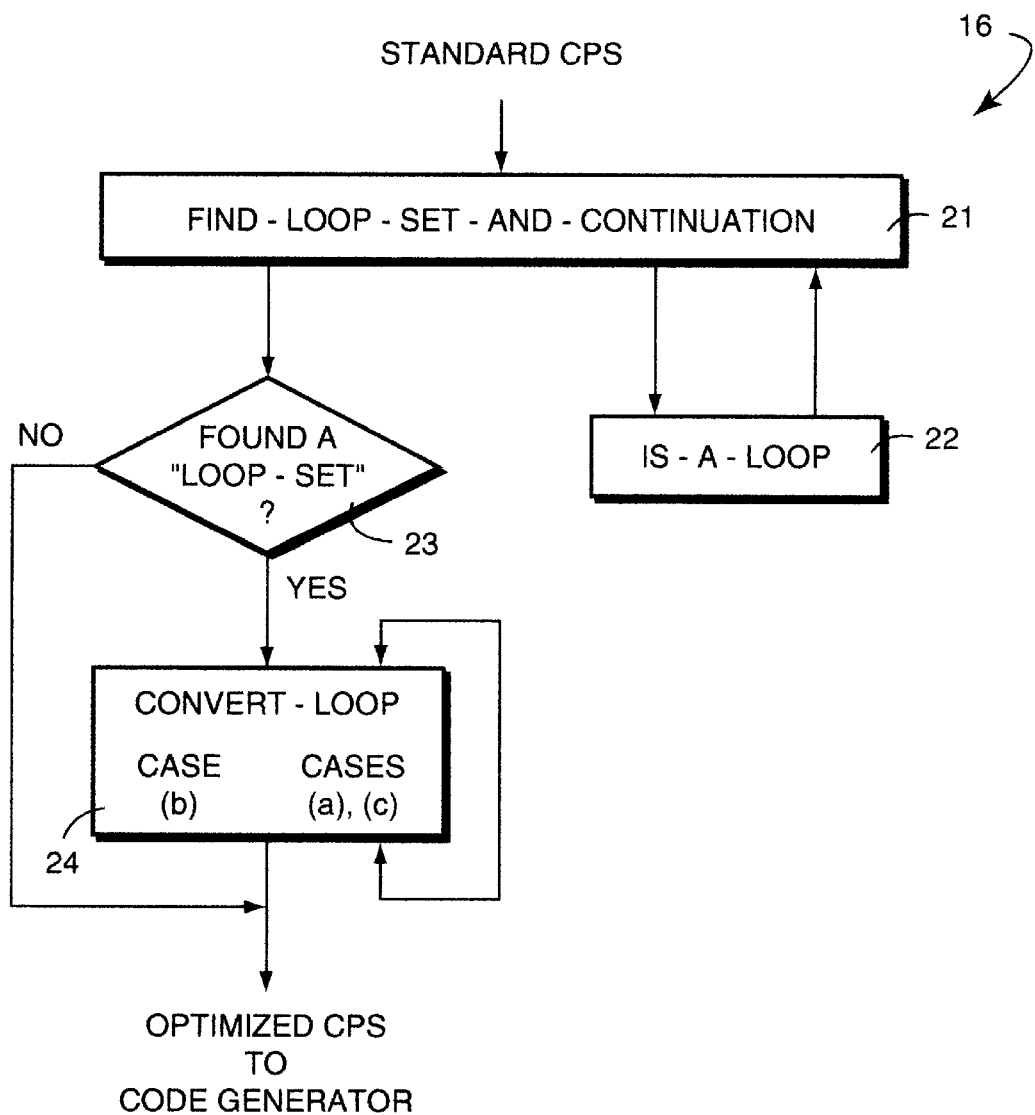
FIG. 2 is a flow chart for processing code in accordance with the invention.
Figure 5:
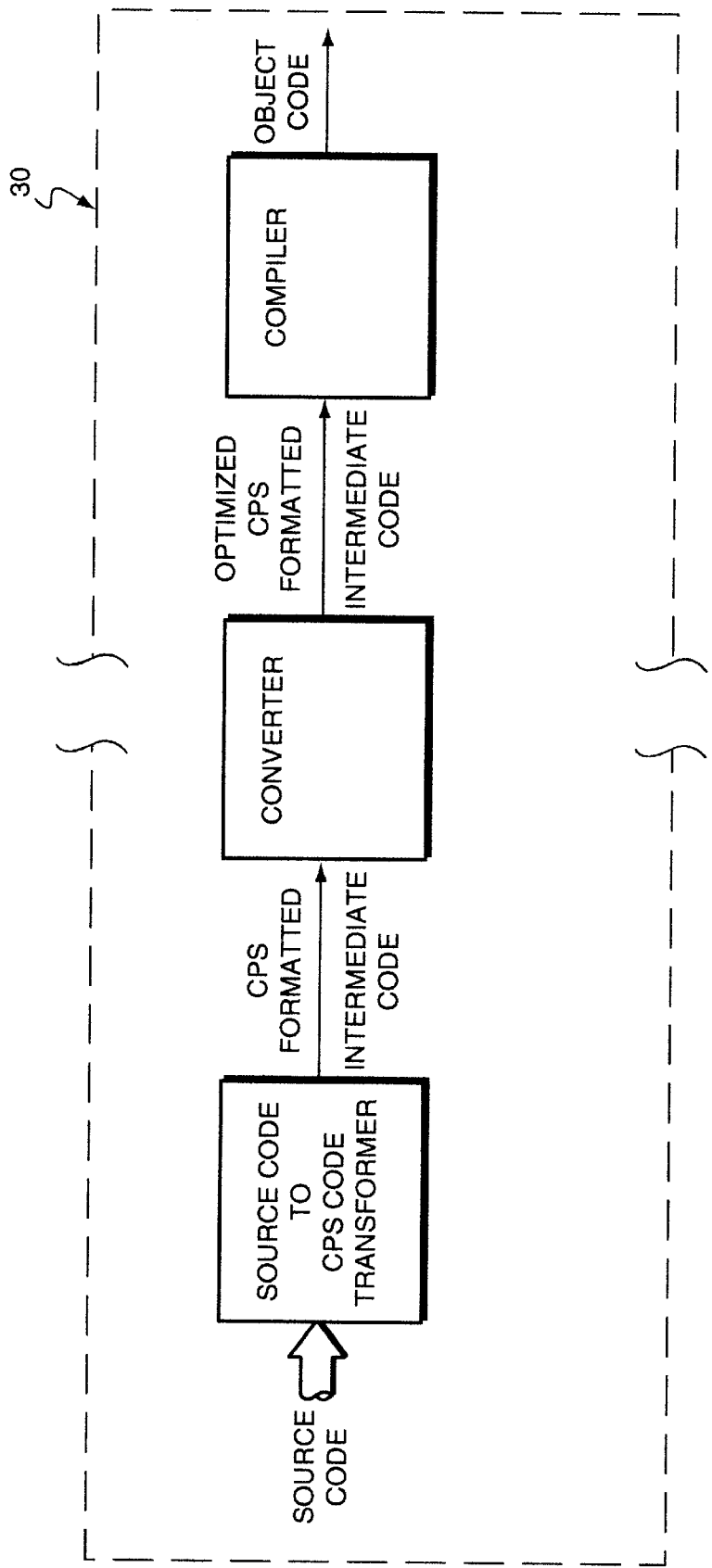
FIG. 5 is a block diagram of the computer of FIG. 3.

Thus, the procedure to be followed to ensure that code representing loops and other code has been converted to the optimized form of CPS such that the resultant code can be compiled with the same code generator that is used for processing non-loop continuation functions is illustrated in FIGS. 2 and 5. The source code is processed in the usual way, and converted to form the standard CPS tree (block 15 of FIG. 1), and, in accordance with the first part of the algorithm of the invention, procedures find-loop-set-and-continuation 21 and is-a-loop-p 22 are then applied. If the find-loop-set-and-continuation procedure returns a full loop set plus the continuation, indicated by the test block 23, then a loop set is present that can be converted 24 to optimized CPS using the convert-loop procedure of the invention. Otherwise, code is present that is retained in its original CPS form. The resultant CPS code can then be processed by the same code generator to generate object code in a more efficient and effective manner.

It will be appreciated that implementing the two parts of the algorithm described above in Scheme or Lisp code will be evident to any programmer of ordinary skill familiar with the language and CPS. It will be further understood that the invention is not limited to the details of the algorithms given, and those skilled in this art following the principles enunciated herein will be able to devise other ways of converting source loop expressions to CPS to produce code that can be processed with the same code generator as non-loop continuation functions in accordance with the invention.

It is further noted that Example 1 is of code that represents a true loop, which is the situation which would principally use the invention for the reasons given above. Examples 2 and 3 do not contain loops in the traditional sense. Nevertheless, the standard CPS tree satisfies the definition of a "loop set", and thus subjecting the standard CPS trees to the convert-loop algorithm of the invention will result in an optimized continuation function that can be treated by the code generator in a simpler and more efficacious manner.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. This scope of the invention is indicated by the appended claims rather than by the foregoing description.

What is claimed is:

1. A computer readable medium comprising program instructions for:
   (a) translating a source code program to CPS format intermediate code containing non-continuation lambda expressions and continuation lambda expressions;
   (b) processing said CPS format intermediate code to locate non-continuation lambda expressions which form a loop set; and
   (c) converting said non-continuation lambda expressions which form a loop set into continuation lambda expressions, and providing an optimized CPS formatted intermediate code wherein the non-continuation lambda expressions are replaced with continuation lambda expressions, each continuation lambda expression of the optimized CPS formatted intermediate code having either (i) one continuation variable and no non-continuation variables or (ii) one or more non-continuation variables and no continuation variables.

2. An apparatus for compiling source code written in the Scheme/Lisp family of list processing languages into optimized continuation passing style (CPS) format intermediate code, which can be compiled into executable object code, the apparatus comprising:

means for translating the source code to CPS format intermediate code containing non-continuation lambda expressions and continuation lambda expressions;

means for processing the CPS format intermediate code to locate the non-continuation lambda expressions which form a loop set; and means for converting the non-continuation lambda expressions which form a loop set into continuation lambda expressions, each continuation lambda expression having either (i) one continuation variable and no non-continuation variables or (ii) one or more non-continuation variables and no continuation variables.

3. A computer system for compiling source code in the Scheme/Lisp family of list programming languages into object code, the system comprising:

means for translating the source code into continuation style passing (CPS) formatted intermediate code;

means for checking the CPS formatted intermediate code to find portions thereof organized as non-continuation lambda expressions within the code which form a loop set;

means for converting the non-continuation lambda expressions that form a loop set into continuation lambda expressions, each continuation lambda expression having either (i) one continuation variable and no non-continuation variables or (ii) one or more non-continuation variables and no continuation variables; and means for compiling the optimized CPS code into executable object code.

4. A compilation method performed in a digital computer for processing a source program in a programming language in the Scheme/Lisp family into a representation known as continuation-passing style (CPS), wherein CPS represents the program as an organization of non-continuation lambda expressions and continuation lambda expressions, the method comprising the steps of:

A) processing the source program to form standard CPS intermediate code;

B) processing the standard CPS intermediate code to identify any non-continuation lambda expressions which form a loop set within the intermediate code, and to identify a distinguished continuation of the loop set within the intermediate code;

C) processing the standard CPS intermediate code to optimize the standard CPS intermediate code by replacing the non-continuation lambda expressions which form loop sets with continuation lambda expressions, each continuation lambda expression of the optimized CPS intermediate code having either (i) one continuation variable and no non-continuation variables or (ii) one or more non-continuation variables and no continuation variables.

5. A method, performed in a digital computer containing a compiler, of translating a source code program written in the Scheme/Lisp family of program languages into an optimized intermediate code in the continuation-passing style (CPS) format which represents the source program as an organization of lambda expressions, wherein the optimized intermediate code can then be compiled to generate executable object code, the method comprising the steps of:

(a) translating the source code program to CPS format intermediate code containing non-continuation lambda expressions and continuation lambda expressions;

(b) processing the CPS format intermediate code to locate the non-continuation lambda expressions which form a loop set; and (c) converting the non-continuation lambda expressions which form a loop set into continuation lambda expressions, and providing an optimized CPS formatted intermediate code wherein the non-continuation lambda expressions are replaced with continuation lambda expressions, each continuation lambda expression of the optimized CPS formatted intermediate code having either (i) one continuation variable and no non-continuation variables or (ii) one or more non-continuation variables and no continuation variables.

6. The method of claim 5 further comprising the step of compiling the optimized CPS formatted code to form machine executable object code.

7. The method of claim 5 wherein the step of processing comprises the step of:

B1) processing the CPS format intermediate code to identify non-continuation lambda expressions within the intermediate code with the property that every reference to every name of the non-continuation lambda expression is a call.

8. The system of claim 7 further comprising:

means for processing the object code to optimize the run-time performance of the object code in the digital computer.

9. The system of claim 7, wherein said means for checking the intermediate code comprises means for examining the intermediate code for non-continuation lambda expressions with the property that every reference to every name of the NCLEs is a call, and the call is either tail call from some member of the set or a call with some distinguished continuation argument.

10. The method of claim 5 wherein the step of processing comprises the step of:

B2) processing the CPS format intermediate code to identify non-continuation lambda expressions within the intermediate code with the property that every reference to every name of the non-continuation lambda expression is a call which is either a tail call from a member of the loop set, or a call with a continuation variable which works to make a loop set.

* * * * *

UNITED STATES PATENT AND TRADEMARK OFFICE
CERTIFICATE OF CORRECTION

PATENT NO. : 5,881,291 Page 1 of 1
APPLICATION NO. : 08/915388
DATED : March 9, 1999
INVENTOR(S) : Jeffrey E. Piazza It is certified that error appears in the above-identified patent and that said Letters Patent is hereby corrected as shown below:

Title Page,
Add -- [73] Assignee: Apple Computer, Inc., Cupertino, CA., USA --

Signed and Sealed this

Seventh Day of October, 2008

JON W. DUDAS
*Director of the United States Patent and Trademark Office*